Aug. 25, 1959     G. A. LYON     2,901,291
WHEEL COVER
Filed Sept. 16, 1954
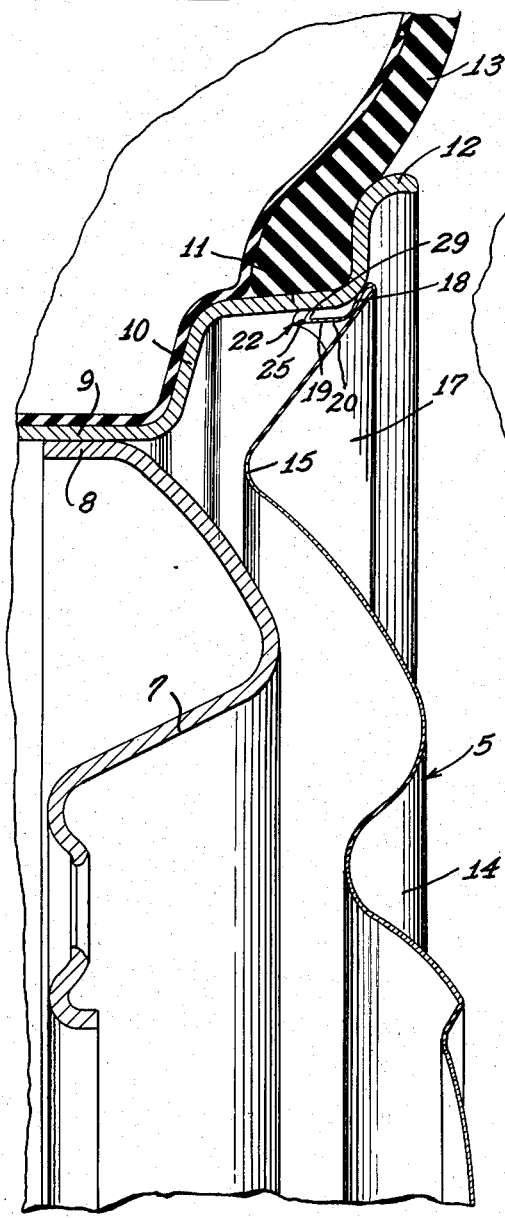
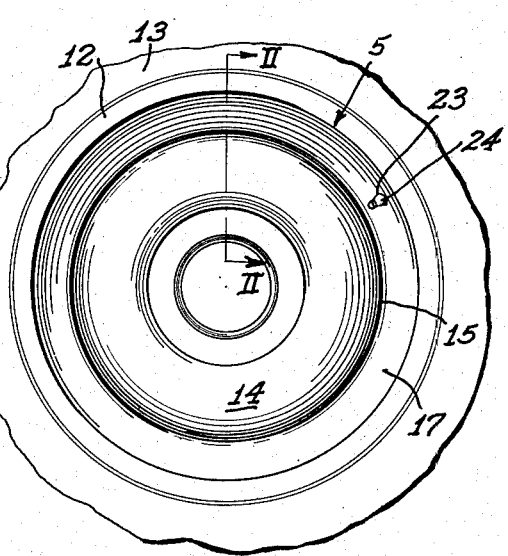
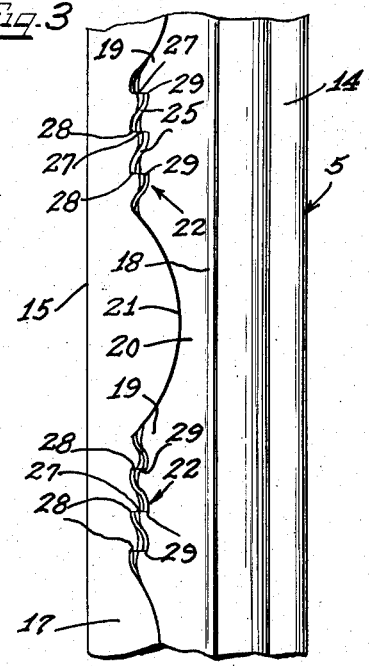
Inventor
GEORGE ALBERT LYON

United States Patent Office 2,901,291
Patented Aug. 25, 1959

2,901,291
WHEEL COVER
George Albert Lyon, Detroit, Mich.

Application September 16, 1954, Serial No. 456,366

8 Claims. (Cl. 301—37)

The present invention relates to improvements in wheel structures and more particularly concerns the ornamental and protective covering of the outer sides of vehicle wheels.

An important object of the present invention is to provide an improved wheel structure having thereon a cover of the self-retaining type especially equipped to prevent turning on the wheel.

Another object of the invention is to provide an improved wheel cover having self-retaining means thereon provided with improved means for holding the cover against turning on the wheel.

A further object of the invention is to provide in a wheel cover improved retaining finger means with a novel turn-preventing construction.

Still another object of the invention is to provide in a wheel cover improved retaining finger means having retaining edges constructed and arranged for substantially improved retention of the cover on a wheel.

Other objects, features and advantages of the present invention will be readily apparent from the following detailed description of a preferred embodiment thereof taken in conjunction with the accompanying drawing, in which:

Figure 1 is a side elevational view of a wheel structure embodying features of the invention;

Figure 2 is an enlarged fragmentary radial sectional view taken substantially on the line II—II of Fig. 1; and Figure 3 is a fragmentary edge elevational view of the cover.

In the practice of the present invention, a wheel cover 5 is adapted to be applied to the outer side of a vehicle wheel comprising a wheel body 7 preferably of the stamped disk spider type having a marginal axially extending flange 8 secured in suitable manner to a base flange 9 of a tire rim. The tire rim is of the multi-flanged drop center type having a side flange 10 extending generally radially outwardly and sloping axially outwardly from the base flange 9 and joining a generally axially outwardly but radially outwardly oblique sloping intermediate flange 11 which merges with a terminal flange 12. Arranged to be supported by the tire rim is a pneumatic tire and tube assembly 13 which may, however, have substituted therefor the tubeless tire if preferred.

According to the present invention the cover 5 is of the general type disclosed and claimed in my issued Patent 2,624,634, dated January 6, 1953. To this end the cover comprises a central or crown portion 14 for overlying the wheel body 7 and merging at a dished annular juncture 15, generally overlying juncture of the wheel body with the tire rim, with a generally radially and axially outwardly directed annular portion 17 for overlying the tire rim.

At its outer margin the cover portion 17 has an underturned generally radially and axially inwardly directed annular flange 18 adapted in assembly to rest against the shoulder between the tire rim flanges 11 and 12. This underturned flange 18 carries cover retaining means in the form of a series of generally axially inwardly directed cover retaining fingers 19 provided in the present instance as inward extensions from an annular continuous generally axially inwardly directed terminal flange portion 20 projecting angularly inwardly at the inner margin of the underturned flange 18. As will be observed from Fig. 2, the fingers 19 and the flange portion 20 are on a diameter somewhat smaller than the inside diameter of the axially outer portion of the tire rim flange 11 so that in assembly with the wheel the flange 20 and the fingers 19 extend generally telescopically into the rim flange 11. There may be as many of the retaining fingers 19 as preferred, such as from 8 to 16, depending upon the material from which the cover is made, the size of the wheel and the particular design of the cover.

Stainless steel strip or sheet material, or brass sheet or strip may be utilized in making of the cover 5. Such material lends itself well to the formation of the cover and also to finishing of the cover as for example by polishing and plating.

Each of the retaining fingers 19 is of substantial, stiff resilience enabling radial resilient deflection and such resilience is enhanced by having the fingers of substantial width, transversely curved generally conformable to the circumferential curvature of the cover, and by having the sides of the fingers tapering divergently into generally arcuate cut outs 21 in the flange 20. Thereby generally radially outwardly and oblique short and stiff retaining finger terminals 22 are adapted to effect a strong retaining gripping cover-retaining engagement with the tire rim flange 11. At their outer edges the retaining finger terminals normally project to a diameter which is slightly greater than the diameter of the rim flange 11 engaged by the fingers so that as an incident to applying the cover to the wheel by centering the cover and then pressing it axially inwardly, the retaining finger terminals 22 cam axially inwardly and radially inwardly along the slope of the intermediate flange 11 and thus gradually place the retaining fingers 19 under substantial resilient tension reacting against the finger terminals 22 for imparting substantial radially outward thrust force thereon to enhance the grip of the finger terminals against the tire rim flange.

In addition to maintaining the cover 5 against axially outward displacement from the wheel, the retaining finger terminal flange portions 22 function herein to retain the cover against turning on the wheel in response to the torque forces encountered in service. Thereby the cover is held effectively against torsional movement which would carry a valve stem aperture 23 out of register with a valve stem 24. To this end, the retaining finger terminals 22 are separated into a plurality of sections 25 having the respective adjacent edges thereof relatively offset. This is accomplished by generally radially slitting the terminals 22 along lines 27 to provide the several sections 25 and then twisting the sections 25 about a radial axis to depress one side and relatively elevate the other side. In this manner the side edges which have been depressed provide respective spur-like corners 28 while the side edges that have been pushed up or generally axially outwardly provide oppositely directed spur corners 29. The spur corners 28 and 29 dig into the surface of the rim flange 11 and thereby through their cumulative effect efficiently retain the cover against turning on the wheel.

Since under any given set of service conditions the axially inner spurs 28, or the axially outer spurs 29 may be the most effective in engaging the tire rim flange to prevent turning of the cover, an equalized arrangement of these spurs is preferably provided. This equalization is effected by having the spurs 28 and 29 directed in respectively opposite circumferential directions on different ones of the retaining fingers as, for example, on adjacent fingers as shown in Fig. 3 where it will be observed that the spurs 28 on one of the fingers are directed in one circumferential direction while the spurs 28 of the other finger are directed in the opposite circumferential direction. Similarly, the spurs 29 of one of the fingers are directed in one circumferential direction and the spurs 29 of the other finger are directed in the opposite circumferential direction.

It will be understood, of course, that the retaining terminals 22 of all of the fingers of an entire set on the wheel cover may be provided with the slit separated sections and twisted arrangement of the sections to provide cover retaining spurs. On the other hand, it may be desirable to provide only a few or even only two of the retaining fingers with the turn preventing spurs. This will depend upon operating requirements, type of material used in the cover, weight of the cover, and the like.

It will be understood that modifications and variations may be effected without departing from the scope of the novel concepts of the present invention.

I claim as my invention:

1. In a wheel structure including a tire rim having a generally radially facing flange, a cover for disposition at the outer side of the wheel having generally axially inwardly directed cover retaining fingers provided with generally radially extending short and stiff cover retaining terminal flanges, said flanges being divided into a plurality of sections having the adjacent edges thereof relatively axially offset and provided with corners cooperable with the tire rim flange to retain the cover against turning on the wheel.

2. In a wheel structure including a tire rim having a generally radially facing flange, a cover for disposition at the outer side of the wheel having generally axially inwardly directed cover retaining fingers provided with generally radially extending short and stiff cover retaining terminal flanges, said flanges being divided into a plurality of sections having the adjacent edges thereof relatively axially offset and provided with corners cooperable with the tire rim flange to retain the cover against turning on the wheel, said corners being directed in respectively opposite circumferential directions so that turning of the cover in either circumferential direction on the wheel is prevented.

3. In a cover for disposition at the outer side of a vehicle wheel, means for retaining the cover on a wheel comprising a retaining finger having a retaining terminal thereon provided with a plurality of sections having adjacent relatively axially offset edges affording spur-like corners to engage a wheel flange in a manner to restrain the cover against circumferential movement on the wheel, said terminals comprising generally radially angled flanges subdivided by radial slitting.

4. In a cover for disposition at the outer side of a vehicle wheel, means for retaining the cover on a wheel comprising a finger having an angled retaining terminal generally radially slit and having the portions at opposite sides of the slit relatively axially offset and providing turn-preventing corner spur structure.

5. In a cover for disposition at the outer side of a vehicle wheel, a cover body having an underturned outer marginal flange, a cover retaining finger extending from said flange and having an angled cover retaining terminal divided into twisted sections affording turn-preventing circumferentially directed spur-like corners on the sections.

6. In a cover for disposition at the outer side of a vehicle wheel, a retaining finger on the cover having a cover retaining terminal subdivided into a plurality of sections twisted to provide radially outer and radially inner corner spur-like points for turn-preventing engagement with a cover flange.

7. In a cover for disposition at the outer side of a vehicle wheel, a cover body having therebehind a plurality of cover retaining fingers provided with angled terminals, said angled terminals being divided into a plurality of sections with relatively offset side edges providing turn-preventing spurs engageable with a flange of a wheel, said turn-preventing spurs on each of the fingers being offset respectively axially inwardly and axially outwardly and the respective axially outwardly directed spurs on the respective fingers being disposed in respectively opposite circumferential directions.

8. In a cover for disposition at the outer side of a vehicle wheel, a cover body having therebehind a plurality of generally axially extending cover retaining fingers of substantial width in circumferential direction provided with angled axially inner distal terminals, said angled terminals being divided by cuts thereinto into a plurality of sections with turned side edges providing turn-preventing spur-like projections engageable with a flange of a wheel.

References Cited in the file of this patent

UNITED STATES PATENTS

| | | |
|---|---|---|
| 1,540,508 | White | June 2, 1925 |
| 1,800,173 | Anderson | Apr. 7, 1931 |
| 2,624,634 | Lyon | Jan. 6, 1953 |
| 2,698,203 | Landell | Dec. 28, 1954 |
| 2,732,262 | Buerger | Jan. 24, 1956 |